United States Patent Office 3,088,068
Patented Apr. 30, 1963

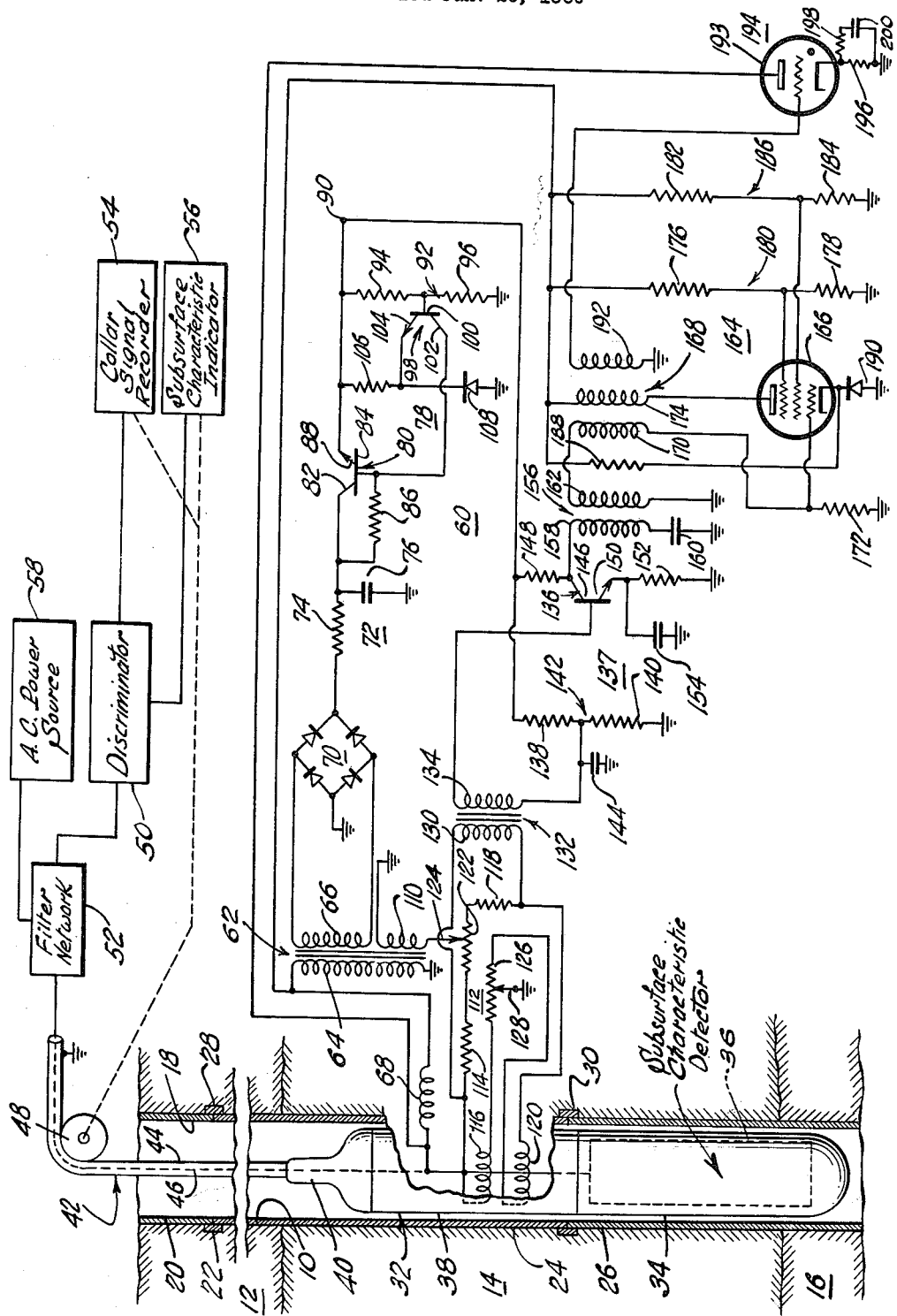

3,088,068
COLLAR LOCATING SYSTEM
Hugh E. Hall, Jr., and Robert W. Pitts, Jr., Houston, Tex., assignors to Texaco Inc., New York, N.Y., a corporation of Delaware
Filed Jan. 25, 1960, Ser. No. 4,456
13 Claims. (Cl. 324—34)

This invention relates to a system for detecting changes in the amount of magnetic material encountered in a borehole during a traverse thereof with an exploring unit and, more particularly, to a system for locating iron collars used to couple adjacent pipes of a borehole casing.

In accordance with this invention the collar locating system may be readily inserted into an exploring unit of a conventional well logging system which is being run inside of a casing and the output of the collar locating system is coupled directly to the transmission circuit of the conventional well logging system.

In an embodiment of the present invention the collar locating system includes a balanced brideg energized by an operating voltage transmitted through a logging cable and responsive to changes in magnetic materials surrounding at least one element of the bridge and means for substantially short circuiting the operating voltage temporarily when the bridge becomes unbalanced.

For a better understanding of the invention reference may be had to the accompanying drawing in which the single FIGURE is a vertical sectional view through a well showing a circuit diagram of the collar locating system of the present invention in relationship with a conventional well logging system.

Referring to the figure more specifically, a well or borehole 10 is shown traversing a plurality of earth formations 12, 14 and 16. The borehole 10 is lined with a casing 18 which is made up of a plurality of iron pipes, for example, pipes 20, 22, 24 and 26 and a plurality of iron collars 28 and 30 which are used to couple in a well-known manner adjacent pipes to form the casing 18. Disposed within the casing 18 is an elongated exploring unit 32 which includes a first detector casing 34 at the lower end thereof for housing a subsurface characteristic detector 36 which may be, for example, a radiation detector, a collar locator casing 38, made of a non-magnetic material, which houses the borehole collar locating unit of the collar locating system and which will be described in more detail hereinafter, and a cable head 40 which is adapted to be connected to the first detector casing 34 or the collar locator casing 38. The exploring unit 32 is supported within the casing 18 by a cable 42 which has an outer sheath 44, preferably made of steel strands, and a single conductor 46, preferably made of copper, which is insulated from the sheath 44. The lower end of the cable 42 is mechanically connected to the cable head 40. The cable 42 engages a depth measuring device 48 located at the earth's surface and the upper end of the cable 42 is electrically connected to a conventional discriminator 50 through a filter network 52. The discriminator 50 has a first output which is coupled to a collar signal recorder 54 which is used to record the signals which indicate the location of the collars of casing 18 and a second output which is coupled to a subsurface characteristic indicator 56 which may be a conventional recorder for recording the signals from the subsurface characteristic detector 36. An alternating current power source 58 is coupled to the upper end of the logging cable 42 through the filter network 52.

Within the collar locator casing 38 is a transistorized direct current voltage power supply 60 which is coupled to the conductor 46 of the logging cable 42 through a power transformer 62 which has a primary winding 64 and a first secondary winding 66. One terminal of the primary winding 64 is connected to the conductor 46 of the cable 42 through a radio frequency choke coil 68, the other terminal of the primary winding 64 being connected directly to ground. The secondary winding 66 of the transformer 62 is connected across a full wave bridge rectifier 70 which may be of any conventional form. The output of the bridge rectifier 70 is connected to a voltage smoothing or filter circuit 72 which includes a resistor 74 and a capacitor 76, the resistor 74 being connected between the output of the bridge rectifier 70 and one terminal of the capacitor 76, the other terminal of the capacitor 76 being connected directly to ground. The output of the filter circuit 72 is connected to a transistor voltage regulator 78 which may be of a conventional type. The transistor voltage regulator illustrated in the figure includes a first transistor 80 having a collector 82 connected to the junction point between the resistor 74 and the capacitor 76 of the filter circuit 72, a base 84 which is connected to the collector 82 through a first resistor 86 and an emitter 88 which is connected directly to a positive potential output terminal 90 of the power supply 60. A voltage divider 92 having a first resistor 94 and a second resistor 96 is connected between the output terminal 90 of the power supply 60 and ground. A second transistor 98 has a base 100 connected to the junction point of the two resistors 94 and 96 of the voltage divider 92, a collector 102 connected directly to the base of the first transistor 80 and an emitter 104 connected to the output terminal 90 of the power supply 60 through a second resistor 106, and a diode 108 is connected between the emitter 104 of the second transistor 98 and ground.

The power transformer 62 also has a second secondary winding 110 connected at one terminal to ground and at the other terminal to a bridge network, preferably the Maxwell bridge 112 illustrated in the figure of the drawing. The Maxwell bridge has two parallel circuits connected between the secondary winding 110 and ground. The first of these two parallel circuits includes a first fixed resistor 114 connected in series with a first coil 116. The second parallel circuit includes a second fixed resistor 118 connected in series with a second coil 120, which under similar conditions has the same inductance as the first coil 116. In order to simply and accurately balance the bridge 112 a first variable tap voltage divider resistor 122 is connected between the first and second fixed resistors 114 and 118. A tap 124 of the voltage divider resistor 122 is connected to the second secondary winding 110 of the power transformer 62. A second variable tap voltage divider resistor 126 is connected between the first and second coils 116 and 120. A tap 128 of the second variable voltage divider resistor 126 is connected directly to ground.

A primary winding 130 of an impedance matching transformer 132 is connected at one of its terminals to the junction point between the first fixed resistor 114 and the first coil 116 and at its other terminal to the junction point between the second fixed resistor 118 and the second coil 120 of the Maxwell bridge 112. A secondary winding 134 of the impedance matching transformer 132 is connected at one of its terminals to the base of a transistor 136 of an amplifier stage 137 and at its other terminal to the junction point between a first resistor 138 and a second resistor 140 of a voltage divider 142. A first capacitor 144 is connected across the second resistor 140 of the voltage divider 142. The voltage divider 142 is connected between the output terminal 90 of the transistorized direct current voltage power supply 60 and ground. The collector 146 of the transistor 136 is connected to the output terminal 90 of the power supply 60 through a first resistor 148. The emitter 150 of the transistor 136 is connected to ground through a second resistor 152. A second capacitor 154 is connected across the second resistor 152. A coupling transformer 156 has a primary winding 158 connected at one of its terminals to the collector 146 of the transistor 136 and at its other terminal to ground through a third capacitor 160. A secondary winding 162 of the coupling transformer 156 is connected to a conventional blocking oscillator 164 which includes a pentode 166 and a three-winding transformer 168. One terminal of the secondary winding 162 of the coupling transformer 156 is conneected to ground. The other terminal of the secondary winding 162 is connected to the control grid of the pentode 166 through a first winding 170 of the three-winding transformer 168. The control grid of the pentode 166 is connected to ground through a grid resistor 172. The anode of the pentode 166 is connected through a second winding 174 of the three winding transformer 168 to the primary winding 64 of transformer 62. The suppressor grid of the pentode 166 is connected to the junction point between a first resistor 176 and a second serially connected resistor 178 of a first voltage divider 180, the voltage divider 180 being connected between the primary winding 64 of the power transformer 62 and ground. The screen grid of the pentode 166 is connected to the junction point between a first resistor 182 and a second serially connected resistor 184 of a second voltage divider 186. The second voltage divider 186 is connected in parallel with the first voltage divider 180. The cathode of the pentode 166 is connected to the primary winding 64 of the power transformer 62 through a voltage dropping resistor 188. The cathode of the pentode 166 is also connected to ground through a Zener diode 190. The diode 190 is connected to the cathode of pentode 166 so as to provide a negative bias for pentode 166 between the cathode and control grid. The cathode of diode 190 is connected to the cathode of pentode 166. On the positive swing of the alternating current voltage in the conductor 46 of the logging cable 62, the Zener diode 190 breaks down at an appropriate voltage to keep pentode 166 cut off when a signal is not present at the control grid of pentode 166. The output of the blocking oscillator 164 is produced across a third winding 192 of the three-winding transformer 168.

The output from the blocking oscillator 164 is applied to the control grid of a hydrogen thyratron 193 of a hydrogen thyratron stage 194. The cathode of the hydrogen thyratron 193 is connected to ground through a first resistor 196. A second resistor 198 and a serially connected capacitor 200 are connected across the first resistor 196. The anode of the hydrogen thyratron 193 is connected directly to the conductor 46 of the logging cable 42.

In operation, the exploring unit 32 is moved through the borehole 10 within the casing 18 having pipes 20, 22, 24 and 26 and casing collars 28 and 30 which are made of a magnetic material. Alternating current voltage from the power source 58 is applied to the subsurface characteristic detector 36 of the exploring unit 32 through the filter network 52 and the cable 42, the voltage at the lower end of the logging cable 42 being preferably 240 volts at 60 cycles per second. The signal at the output of the subsurface characteristic detector 36 is applied to the conductor 46 at the lower end of the cable 42. The 240 volts, 60 cycles per second voltage is applied to the subsurface characteristic detector 36 as an operating voltage and it is also applied to the primary winding 64 of the power transformer 62 through the choke coil 68. The first secondary winding 66 of the power transformer 62 applies a voltage across the full wave bridge rectifier 70 which produces a direct current voltage at the input of the filter circuit 72. After the direct current voltage is filtered by the filter circuit 72 it is applied to the transistor voltage regulator 78 which provides a substantially steady direct current voltage at terminal 90.

The Maxwell bridge 112 in the exploring unit 32 of the collar locating system of the present invention is balanced before it is lowered into the borehole 10. The balancing can be simply and accurately performed by adjusting the taps 124 and 128 of the first and second variable tap voltage divider resistors 122 and 126, respectively. The centers of the first and second coils 116 and 120 are vertically spaced apart, preferably about 6 inches. Since the first and second coils are similar their inductances will be similar when each of the coils are opposite portions of the casing 18 which has the same amount of magnetic material, e.g., when the coils 116 and 120 are at an intermediate point between the ends of a pipe of the casing 18, and, therefore, a voltage will not be produced across the primary winding of the impedance matching transformer 132. When one of the first and second coils 116 and 120 approaches a collar, for example, collar 30 which is made of magnetic material, the inductance of the coil nearest the collar 30, that is, coil 120, increases due to the increase in the magnetic material in the vicinity of the coil 120 increasing the permeability of the flux path of the coil 120 to thus upset the balance of the Maxwell bridge 112. The unbalanced condition of the bridge 112 produces a 60 cycle alternating current voltage across the primary winding 130 of the impedance matching transformer 132 which is amplified by the transistor amplifier stage 137. The amplified 60 cycle per second voltage triggers the blocking oscillator 164 to produce at the output of the blocking oscillator 164, that is, across the third winding 192, a voltage which, when applied to the control grid of the hydrogen thyratron 193 fires the thyratron 193 to produce a low impedance path across the logging cable 42. The 240 volts at the lower end of the logging cable 42 will be sharply decreased to a value of, say, approximately 90 volts. Thus, a signal of approximately 150 volts will be produced at the exploring unit 32 which will be transmitted to the earth's surface passing through the filter network 52 and then to the discriminator 50 from which it can be applied to the collar signal recorder 54.

When the hydrogen thyratron 194 fires, the capacitor 200 will become charged to such an extent that the thyratron 193 will not fire again for a desired time interval equal to one time constant of the cathode circuit of the thyratron 193, for example, for 4 seconds. Thus, if desired, the system will produce only one pulse per collar.

It should be noted that the blocking oscillator 164 and the hydrogen thyratron stage 194 are operated with alternating current voltage from the primary winding 64 of the power transformer 62 on the anodes of the tubes in these circuits. A pulse will be produced across the third winding 192 of the three-winding transformer 168 of the blocking oscillator when the 240 volt, 60 cycle wave is positive at the anode of the pentode 166, at which time the cathode of the pentode 166 is effectively at ground potential, and the Maxwell bridge 112 is unbalanced. To provide an operating voltage for the transistor amplifier stage 137, the transistor 136 is connected to the direct current voltage provided at the terminal 90 of the power supply 60.

Since the output pulses from the conventional subsurface characteristic detector 36 will generally be of the order of a few volts maximum and since the pulse indicating the presence of a casing collar, such as collar 30, will have a magnitude of approximately 150 volts the larger pulse can be readily separated from the smaller pulses by the discriminator 50 and applied to the collar signal recorder 54 while the signal from the detector 36 is applied to the subsurface characteristic indicator 56.

It can be seen that a simple and accurate system has been provided for locating in a borehole casing collars which are made of magnetic materials. When employed with a conventional logging system having a logging cable, the system of the present invention does not require an additional transmission circuit for transmitting to the earth's surface pulses indicative of the location of the collars in the borehole, nor a B+ supply. The collar locating system while providing useful information with regard to the location of the collars in the borehole operate independently of any conventional detector which may be used in the exploring unit yet producing little or no adverse affect on the operation of the conventional detector.

An additional advantage of the system of the present invention is that the collar locator unit may be inserted in series with the alternating current power line to another subsurface logging instrument or may be omitted with essentially no affect on the operation at the other subsurface logging instrument.

Obviously, many modifications and variations of the invention as hereinbefore set forth may be made without departing from the spirit and scope thereof, and therefore, only such limitations should be imposed as are indicated in the appended claims.

We claim:

1. A system for locating changes in the amount of magnetic material in a borehole comprising a bridge assembly responsive to changes in the amount of magnetic material, a transmission line coupled to said bridge assembly, means for applying electric energy to said line, means for moving said bridge assembly through the borehole, means responsive to the output of said bridge assembly for causing a sudden change in the impedance of said line thereby suddenly varying the energy on said transmission line and means coupled to said transmission line for recording said energy variations on said transmission line.

2. A system for locating changes in the amount of magnetic material in a borehole comprising a bridge assembly sensitive to changes in the amount of magnetic material in the vicinity thereof, a transmission line coupled to said bridge assembly, means for applying a voltage to said line, means for moving said bridge assembly through the borehole, means for abruptly and suddenly changing the impedance of said line thereby abruptly and suddenly changing the voltage on said line, said impedance changing means comprising a blocking oscillator and a hydrogen thyratron stage, said blocking oscillator being coupled to the output of said bridge assembly, said hydrogen thyratron stage being operatively coupled and responsive to the output of said blocking oscillator and having an output circuit coupled to said transmission line, and means coupled to said transmission line for recording the decreases in voltage produced by the hydrogen thyratron stage.

3. A system for locating iron casing collars in a borehole comprising a bridge circuit having a pair of similar coils vertically spaced apart, a transmission line coupled to said bridge, means for applying a voltage to said line, means for moving said bridge through the borehole, means responsive to the output of said bridge for causing a sudden current surge thereby varying the voltage in said transmission line in response to a change in the balance condition of said bridge, and means coupled to said transmission line for recording said voltage variations in said transmission line.

4. A system for locating iron casing collars in a borehole comprising a Maxwell bridge having a pair of similar coils vertically spaced apart a fixed distance, a transmission line coupled to said bridge, means for applying a voltage to said line, means for moving said bridge through the borehole, a transistor amplifier stage coupled to the output of said bridge, a blocking oscillator coupled to the output of said transistor amplifier stage, a hydrogen thyratron stage connected across said transmission line and responsive to the output signals from said blocking oscillator and means coupled to said transmission line for recording voltage variations in said transmission line.

5. A system for locating iron casing collars in a borehole comprising an exploring unit including a subsurface characteristic detector, a cable head and a collar locator unit inserted between said cable head and said detector, a single conductor logging cable connected to said cable head for supporting said exploring unit in the borehole and electrically connected to said subsurface characteristic detector and said collar locator unit, an alternating current power source coupled to said logging cable for supplying energy to said exploring unit, said collar locator unit comprising a balanced bridge sensitive to the iron collars in the borehole, a transistor amplifier stage coupled to the output of said bridge, a blocking oscillator coupled to the output of said transistor amplifier stage and a hydrogen thyratron stage coupled across the logging cable and responsive to the output of said blocking oscillator, and recording means coupled to said logging cable for recording the output signals from said subsurface characteristic detector and for recording the variations in the voltage across said hydrogen thyratron stage.

6. A system as set forth in claim 5 wherein said recording means includes a discriminator and wherein said alternating current power source is coupled to the logging cable through a filter network which separates the power energy from the signals produced by said detector and said collar locator unit.

7. A system for locating iron casing collars in a borehole comprising an exploring unit adapted to be moved through the borehole, a source of alternating current voltage, a logging cable connected at one end to the exploring unit and at the other end to said source of alternating current voltage, said logging cable comprising a single insulated conductor and a metallic sheath surrounding said conductor, said exploring unit containing a Maxwell bridge having a pair of similar coils longitudinally spaced apart a fixed distance, a transistor amplifier stage coupled to the output of said bridge, a blocking oscillator coupled to the output of said transistor amplifier stage, a hydrogen thyratron stage having an output connected directly to the single conductor of the logging cable, said hydrogen thyratron stage being responsive to the output of said blocking oscillator, means coupled to said single conductor for producing a direct current voltage, means for applying said direct current voltage as an operating voltage to said transistor amplifier stage, means for coupling said single conductor to said blocking oscillator and to said hydrogen thyratron stage for supplying an operating voltage thereto, and means coupled to the other end of said logging cable for indicating the voltage variations across said hydrogen thyratron stage.

8. A system as set forth in claim 7 wherein said hydrogen thyratron stage includes means responsive to current flow through said hydrogen thyratron stage for preventing the operation of said hydrogen thyratron stage for a predetermined period of time after said current flow so as to produce in said logging cable only one pulse per collar.

9. Apparatus as defined in claim 3 wherein said means for causing said sudden current surge comprises a thyratron.

10. Apparatus as defined in claim 9 wherein said means for causing a sudden current surge further includes an oscillator responsive to a change in the balance condition of said bridge for controlling said thyratron.

11. Apparatus as defined in claim 3 further comprising a subsurface characteristic detector having an output coupled to said transmission line in the borehole and wherein the means coupled to said transmission line for recording said voltage variations in said transmission line is further characterized in that it comprises means for providing a signal indication responsive to said characteristic detector.

12. Apparatus as defined in claim 10 further comprising a subsurface characteristic detector having an output coupled to said transmission line in the borehole and wherein the means coupled to said transmission line for recording said voltage variations in said transmission line is further characterized in that it comprises means for providing a signal indication responsive to said characteristic detector.

13. A system as defined in claim 1 wherein said means for causing a sudden change in the impedance of said line includes further means for rendering said means inoperative for a predetermined time interval following a sudden change in the impedance of said line so as to prevent said means from causing another sudden variation in the energy on said transmission line during said predetermined time interval.

References Cited in the file of this patent

UNITED STATES PATENTS

| | | |
|---|---|---|
| 2,782,365 | Castel | Feb. 19, 1957 |
| 2,817,808 | Gieske | Dec. 24, 1957 |